(12) United States Patent
Wang et al.

(10) Patent No.: US 8,792,253 B2
(45) Date of Patent: Jul. 29, 2014

(54) SYSTEM AND METHODS FOR HIGH POWER DC/DC CONVERTER

(75) Inventors: Duanyang Wang, Harrison, NJ (US); Dariusz Czarkowski, S. Setauket, NY (US); Francisco de Leon, Ridgewood, NJ (US); Kamiar J. Karimi, Kirkland, WA (US); Lijun Gao, Renton, WA (US); Shengyi Liu, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 310 days.

(21) Appl. No.: 13/251,527

(22) Filed: Oct. 3, 2011

(65) Prior Publication Data

US 2013/0083563 A1 Apr. 4, 2013

(51) Int. Cl.
*H02M 3/335* (2006.01)

(52) U.S. Cl.
USPC .............................................. 363/16; 323/272

(58) Field of Classification Search
CPC .................... H02M 2001/0077; H02M 3/285; H02J 9/04
USPC ................. 323/222, 225, 266, 267, 271–272, 323/282–289; 363/16–20, 21.02, 58, 65, 363/69, 98, 131; 307/9.1, 82, 61, 144
See application file for complete search history.

(56) References Cited

U.S. PATENT DOCUMENTS

| | | | | |
|---|---|---|---|---|
| 5,130,561 | A * | 7/1992 | Elliott et al. | 307/31 |
| 6,069,801 | A * | 5/2000 | Hodge et al. | 363/21.02 |
| 7,468,649 | B2 * | 12/2008 | Chandrasekaran | 336/212 |
| 7,646,178 | B1 * | 1/2010 | Fradella | 322/46 |
| 7,746,041 | B2 * | 6/2010 | Xu et al. | 323/223 |
| 7,830,686 | B2 * | 11/2010 | Zeng et al. | 363/69 |
| 8,269,141 | B2 * | 9/2012 | Daniel et al. | 219/130.1 |
| 8,581,147 | B2 * | 11/2013 | Kooken et al. | 219/137.7 |
| 2012/0313431 | A1 * | 12/2012 | Shum et al. | 307/9.1 |

\* cited by examiner

*Primary Examiner* — Rajnikant Patel
(74) *Attorney, Agent, or Firm* — Ameh IP; Lowell Campbell; Elahe Toosi

(57) ABSTRACT

A voltage conversion system and methods are disclosed. Phase-shift modulation signals are generated and interleaved to provide interleaved phase-shift modulation signals. A plurality of voltage converters are controlled using the interleaved phase-shift modulation signals to convert an input electrical current at an input voltage to an output electrical current at an output voltage.

20 Claims, 4 Drawing Sheets

SYSTEM AND METHODS FOR HIGH POWER DC/DC CONVERTER

FIELD

Embodiments of the present disclosure relate generally to electronic power regulators. More particularly, embodiments of the present disclosure relate to electronic DC-to-DC converters.

BACKGROUND

A DC-to-DC converter is an electronic circuit which converts a source of direct current (DC) from one voltage level to another. DC-to-DC converters are important in a variety of application such as power systems and portable electronic devices. DC-to-DC converters may also regulate an output voltage. A step-up/boost converter is a converter with an output DC voltage greater than its input DC voltage. A step-down/buck converter is a converter with a DC output voltage lower than its DC input voltage.

SUMMARY

A voltage conversion system and methods are disclosed. Phase-shift modulation signals are generated and interleaved to provide interleaved phase-shift modulation signals. A plurality of full-bridge voltage converters are controlled using the interleaved phase-shift modulation signals to convert an input electrical current at an input voltage to an output electrical current at an output voltage. In this manner, a low voltage DC power source such as that from a fuel cell stack or a battery is converted to a high voltage DC output.

For example, embodiments of the disclosure provide a means to integrate a low voltage power source such as a fuel cell stack or a battery (typically about 40 to about 60 Vdc) with an aircraft electric power distribution system where regulated dual polarity of about 270 Vdc for powering DC loads and single polarity of about 600 to about 800 Vdc for voltage source inverters are required.

In an embodiment, a method for voltage conversion generates a plurality of phase-shift modulation signals, and interleaves the phase-shift modulation signals to provide interleaved phase-shift modulation signals. The method further controls a plurality of voltage converters using the interleaved phase-shift modulation signals to convert an input electrical current at an input voltage to an output electrical current at an output voltage.

In another embodiment, a voltage conversion system comprises a controller module, and a plurality of voltage converters. The controller module generates phase-shift modulation signals, and interleaves the phase-shift modulation signals to provide interleaved phase-shift modulation signals. The voltage converters are controlled using the interleaved phase-shift modulation signals to convert an input electrical current at an input voltage to an output electrical current at an output voltage.

In yet another embodiment, a method for providing a voltage conversion system provides a controller module, and provides a plurality of voltage converters. The controller module generates a plurality of phase-shift modulation signals, and interleaves the phase-shift modulation signals to provide interleaved phase-shift modulation signals. The voltage converters are controlled using the interleaved phase-shift modulation signals to convert an input electrical current at an input voltage to an output electrical current at an output voltage.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

Figure 1:
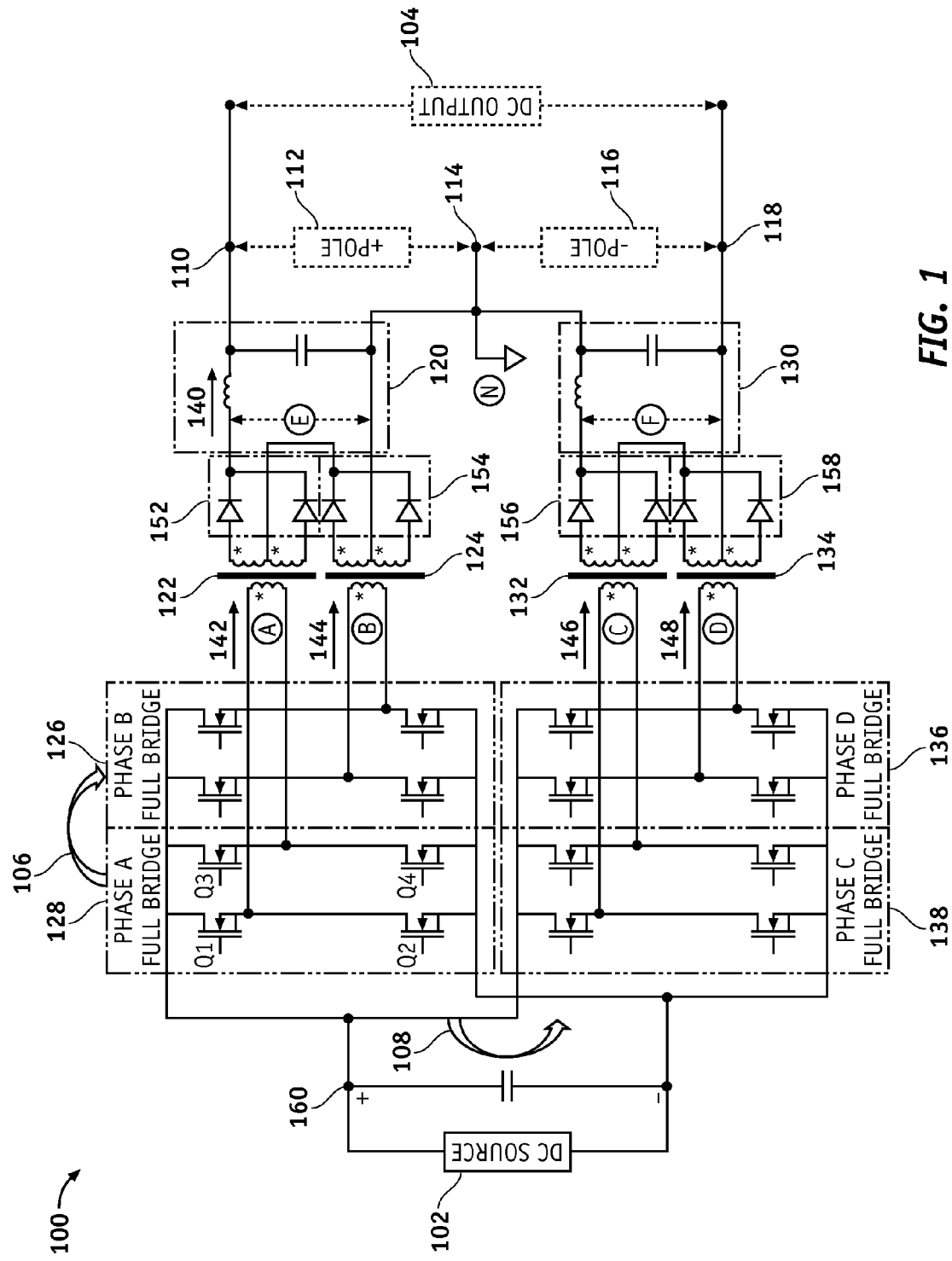
FIG. 1 is an illustration of an exemplary voltage conversion circuit according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to full bridge converters, transformers, low pass filters, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, DC-to-DC conversion for high power aircraft applications. Embodiments of the disclosure, however, are not limited to such aircraft or DC-to-DC conversion applications, and the techniques described herein may also be utilized in other applications. For example but without limitation, embodiments may be applicable to AC-to-DC conversion, DC-to-AC conversion, AC-to-AC conversion, or other conversion.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Embodiments of the disclosure provide, for example, a means to integrate a low voltage power source (e.g., about 40 to about 60 Vdc) with an aircraft electric power distribution system where regulated dual polarity of about 270 Vdc for powering DC loads and single polarity of about 600 to about 800 Vdc for voltage source inverters are required. A high conversion ratio from the low voltage (e.g., about 40 Vdc) to a high voltage (e.g., about 800 Vdc) may be accomplished at a high power (e.g., greater than about 1 kW). The low voltage power source may comprise, for example but without limitation, a fuel cell stack, a solar array, a battery, or other power source.

In one embodiment, a high power DC-to-DC device and method for generating dual polarity of about 270 Vdc, and/or single polarity of about 600 to about 800 Vdc from a low voltage DC source such as a fuel cell stack or a battery is disclosed. The high power DC-to-DC architecture provides a topology, e.g. 4-phase interleaved full bridge converters, with controllable phase shifts among the 4 full-bridge converters, coupled with 4 transformers/rectifiers of series-connected output.

FIG. 1 is an illustration of an exemplary voltage conversion circuit (converter 100) according to an embodiment of the disclosure. Four substantially identical voltage converters (Phase A, B, C, D) each comprise a full bridge converter connected to a transformer. The converter 100 comprises a Phase A voltage converter, a Phase B voltage converter, a Phase C voltage converter, and a Phase D voltage converter configured such that all of their inputs are connected to a DC power source 102. The Phase A voltage converter comprises a first full bridge converter 128, a first transformer 122, a first rectifier 152 and a first low pass filter 120. The Phase B voltage converter comprises a second full bridge converter 126, a second transformer 124, a second rectifier 154, and the first low pass filter 120. In this manner, Phase A and Phase B share the first low pass filter 120; however, in other embodiments each phase may comprise a low pass filter. The Phase C voltage converter comprises a third full bridge converter 138, a third transformer 132, a third rectifier 156, and a second low pass filter 130. The Phase D voltage converter comprises a fourth full bridge converter 136, a fourth transformer 134, a fourth rectifier 158, and the second low pass filter 130. In this manner, Phase C and Phase D share the second low pass filter 130; however, in other embodiments each phase may comprise a low pass filter.

The first full bridge converter 128 comprises an electronic circuit operable to enable conversion of a converter input voltage 160 from the DC source 102, to enable an output voltage to be applied across the first transformer 122 as either a positive or a negative voltage, and to enable a phase A output current 142 converted from the DC source 102 to be sent through the first transformer 122 as either a positive or a negative current. Closing switch Q1 and switch Q4 allows the phase A output current 142 to be sent through the first transformer 122 as a positive current. Closing switch Q2 and switch Q3 allows the phase A output current 142 to be sent through the first transformer 122 as a negative current. The first full bridge converter 128 operates at a first phase (Phase A).

The second full bridge converter 126 comprises an electronic circuit operable to enable conversion of the converter input voltage 160 from the DC source 102, to enable an output voltage to be applied across the second transformer 124 as either a positive or a negative voltage, and to enable a phase B output current 144 converted from the DC source 102 to be sent through the second transformer 124 as either a positive or a negative current. The second full bridge converter 126 operates at a second phase (Phase B). The Phase B may comprise, for example but without limitation, an about 90 degree phase shift from Phase A, an about 180 degree phase shift from Phase A, or other suitable phase shift.

As those of ordinary skill in the art would understand, a phase shift may comprise a phase of a signal offset in phase from another signal. For example, circuits of Phase B may be controlled with signals modulated with a phase offset about 90 degrees from Phase A.

The third full bridge converter 138 comprises an electronic circuit operable to enable conversion of the converter input voltage 160 from the DC source 102, to enable an output voltage to be applied across the third transformer 132 as either a positive or a negative voltage, and to enable a phase C output current 146 converted from the DC source 102 to be sent through the third transformer 132 as either a positive or a negative current. The third full bridge converter 138 operates at a third phase (Phase C). The phase C may comprise, for example but without limitation, an about 45 degree phase shift from Phase A, an about 90 degree phase shift from Phase A, or other suitable phase shift.

The fourth full bridge converter 136 comprises an electronic circuit operable to enable conversion of the converter input voltage 160 from the DC source 102, to enable an output voltage to be applied across the fourth transformer 134 as either a positive or a negative voltage, and to enable a phase D output current 148 converted from the DC source 102 to be sent through the fourth transformer 134 as either a positive or a negative current. The fourth full bridge converter 136 operates at a fourth phase (Phase D). The Phase D may comprise, for example but without limitation, an about 135 degree phase shift from Phase A, an about 270 degree phase shift from Phase A, or other suitable phase shift.

The first transformer 122, the second transformer 124, the third transformer 132, and the fourth transformer 134 are each operable to transform a first AC voltage of a first AC current (e.g., the phase A output current 142, the phase B output current 144, the phase C output current 146, and the phase D output current 148 respectively) to a second AC voltage at a ratio of, for example but without limitation, 1-to-6, 3-to-1, or other suitable transformer ratio.

In the embodiment shown in FIG. 1, the first rectifier 152, the second rectifier 154, the third rectifier 156, and the fourth rectifier 158 each comprise a full-wave rectifier. Alternatively, the first rectifier 152, the second rectifier 154, the third rectifier 156, and the fourth rectifier 158 may each comprise, for example but without limitation, a transformer center-tapped rectifier, a bridge rectifiers, or other suitable rectifier. The first rectifier 152 is operable to DC rectify an AC output of the first transformer 122. The second rectifier 154 is operable to DC rectify an AC output of the second transformer 124. The third rectifier 156 is operable to DC rectify an AC output of the third transformer 132. The fourth rectifier 158 is operable to DC rectify an AC output of the fourth transformer 134.

The first low pass filter 120 and the second low pass filter 130 may each comprise, for example but without limitation, an RC filter, an RLC filter, or other suitable low-pass filter. The first low pass filter 120 is operable to smooth an output of the first rectifier 152 in series with the second rectifier 154. The second low pass filter 130 is operable to smooth an output of the third rectifier 156 in series with the fourth rectifier 158.

Phases A and B and their respective transformers 122/124 and rectifiers 152/154 comprise an upper arm E of the converter 100, and Phases C and D and their respective transformers 132/134 and rectifiers 156/158 comprise a lower arm F of the converter 100.

Phases A and B are connected in series such that the converter 100 produces +270 Vdc at the upper arm E (referenced to N). Phases C and D are connected in series such that the converter 100 produces −270 Vdc at the lower arm F (referenced to N). The +270 VDC and −270 VDC outputs are obtained after rectification. A series connection of arms E and F allows the converter 100 to produce 540~800 Vdc through a phase-shift modulation of full bridge converters. When Phase B is 90 degree lagging to Phase A in the upper arm, (so is Phase D to Phase C in the lower arm), and Phase C is 45 degree lagging to Phase A, the minimum input current ripple is achieved. In this manner an interleaved operation Mode 1 is achieved.

Phase B lagging Phase A (Phase D to Phase C) may be changed from 90 degree to 180 degree, and Phase C lagging to Phase A (Phase D to Phase B) may be changed from about 45 degree to about 90 degree. At about 180 degree lagging between Phase B and Phase A, and about 90 degree lagging between Phase C and Phase A, an interleaved operation Mode 2 is achieved. The converter 100 input current ripple is 2 times smaller compared to that of a single full bridge converter. In general, the converter 100 input current ripple and output voltage ripple are the functions of interleaving angles of 4 full-bridge converters.

Embodiments of the disclosure provide an architecture that uses an interleaved 4-phase full bridge converter coupled with transformers/rectifiers to produce about ±270 Vdc output voltage, and uses phase-shift modulation to produce up to about 800 Vdc output voltage from a source of variable low voltage from about 40 to about 60 Vdc. The outputs of the converter 100 can either distribute about ±270 Vdc for common aircraft DC loads or about 600 about 800 Vdc for common aircraft voltage source inverters.

Figure 2:
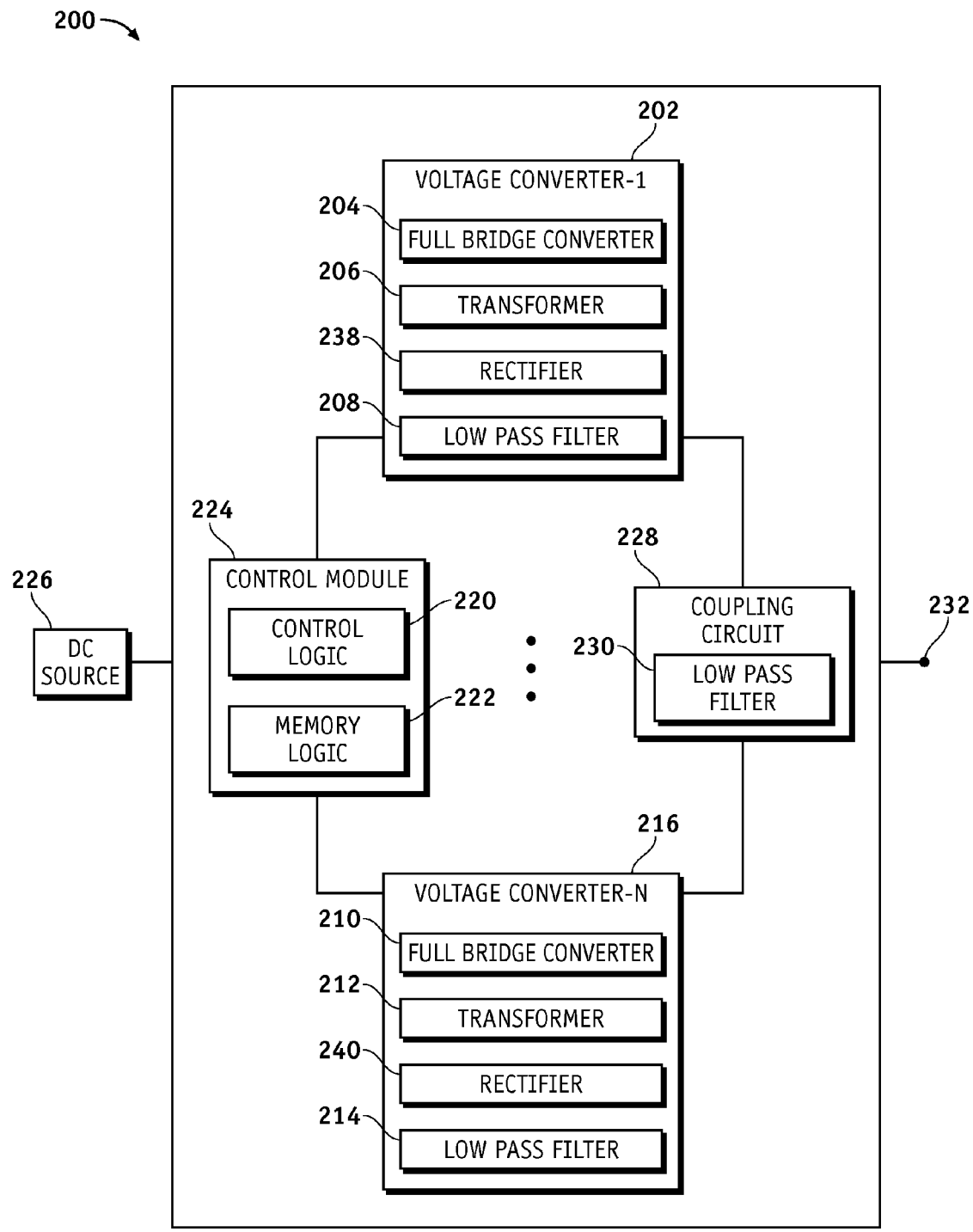
FIG. 2 is an illustration of an exemplary functional block diagram of a voltage conversion system according to an embodiment of the disclosure.

FIG. 2 is an illustration of an exemplary functional block diagram of a voltage conversion system (system 200) according to an embodiment of the disclosure. A practical system 200 may comprise any number of input modules, any number of processor modules, any number of memory modules, and any number of other modules. The illustrated system 200 depicts a simple embodiment for ease of description. These and other elements of the system 200 are interconnected together, allowing communication between the various elements of system 200. In one embodiment, these and other elements of the system 200 may be interconnected together via a coupling circuit 228. Those of skill in the art will understand that the various illustrative blocks, modules, circuits, and processing logic described in connection with the embodiments disclosed herein may be implemented in hardware, computer-readable software, firmware, or any practical combination thereof.

To illustrate clearly this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present disclosure.

The system 200 may have functions, material, and structures that are similar to the embodiments shown in FIG. 1. Therefore, common features, functions, and elements may not be redundantly described here.

The system 200 may comprise any number of voltage converters 1-N such as a voltage converter-1 202 and a voltage converter-N 216 (Nth voltage converter), the coupling circuit 228, and a control module 224. N may be an integer greater than 1. Higher values of N can be selected to achieve a higher voltage and power level by coupling more phases thereby achieving even smaller ripples at input side as well as at output side.

The voltage converters 1-N (202 to 216) are operable to convert an input voltage of a DC source 226 to an output voltage at output 232. The voltage converters 1-N may each comprise, for example but without limitation, a full bridge converter 204/210, a transformer 206/212, a rectifier 238/240, a low pass filter 208/214, or other suitable circuit components.

For example, in one embodiment, the voltage converters 1-N may comprise four full bridge converters similar to the embodiment shown in the converter 100 of FIG. 1. In this case, the voltage converters 1-N comprise a structure wherein four full bridge converters 128/126/138/136 are coupled to a same source (DC source 102) at their inputs. Each of the full bridge converters 128/126/138/136 is coupled to each of the transformers 122/124/126/128 respectively, which is then connected to each of the rectifiers 152/154/156/158 respectively. The rectifiers 152/154/156/158 are connected in series through a center-tap of the transformers 122/124/126/128.

Alternatively, the voltage converters 1-N may be coupled in various ways to obtain high DC voltage, for example but without limitation, if a number of the full bridge converters 204/210 is more than 4 (e.g., N>4), then a series connection of outputs of more than 2 rectifiers may be accomplished. Furthermore, each embodiment can be expanded to a higher voltage and power level by coupling more phases and increasing N, which can achieve even smaller ripples at an input side as well as at an output side.

The coupling circuit 228 is operable to couple the voltage converters 1-N to one-another. The voltage converters 1-N may be coupled by the coupling circuit 228 in, for example but without limitation, series, parallel, a mixture of series and parallel, or other coupling configuration. The coupling circuit 228 may comprise zero or more low pass filters 230 operable to, for example but without limitation, smooth a ripple between stages of the voltage converters 1-N. In order to output a regulated DC voltage, one or more of the low pass filters 208/214/230 may be necessary.

The control module 224 comprises control logic 220 and memory logic 222. The control module 224 is operable to generate phase control signals for controlling the voltage converters 1-N. The control module 224 may perform, for example but without limitation, sequential gate signal generation for transistors (e.g. Q1, Q2, Q3, Q4 in FIG. 1), phase-shift modulation control for each full bridge converter (e.g., 128/126/138/136 in FIG. 1) to achieve different output voltages, control phase interleaving to achieve minimum ripple size, and other suitable control functions.

The control logic 220 comprises processing logic that is configured to carry out the functions, techniques, and processing tasks associated with the operation of the system 200. In particular, the processing logic is configured to support the system 200 described herein. The control logic 220 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like.

A processor may also be implemented as a combination of computing devices, e.g., a combination of a digital signal processor and a microprocessor, a plurality of microprocessors, one or more microprocessors in conjunction with a digital signal processor core, or any other such configuration.

The memory logic 222 may comprise a data storage area with memory formatted to support the operation of the system 200. The memory logic 222 is configured to store, maintain, and provide data as needed to support the functionality of the system 200. For example, the memory logic 222 may store phase shift values, time intervals, voltage values, or other data.

In practical embodiments, the memory logic 222 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory logic 222 may be coupled to the control logic 220 and configured to store, for example but without limitation, a database, a computer program that is executed by the control logic 220, an operating system, an application program, tentative data used in executing a program, or other application. Additionally, the memory logic 222 may represent a dynamically updating database containing a table for updating the database.

The memory logic 222 may be coupled to the control logic 220 such that the control logic 220 can read information from and write information to the memory logic 222. For example, as mentioned above, the control logic 220 may access the memory logic 222 to access the phase shift values, time intervals, voltage values, and other data.

As an example, the control logic 220 and memory logic 222 may reside in respective application specific integrated circuits (ASICs). The memory logic 222 may also be integrated into the control logic 220. In an embodiment, the memory logic 222 may comprise a cache memory for storing temporary variables or other intermediate information during execution of instructions to be executed by the control logic 220.

Figure 3:
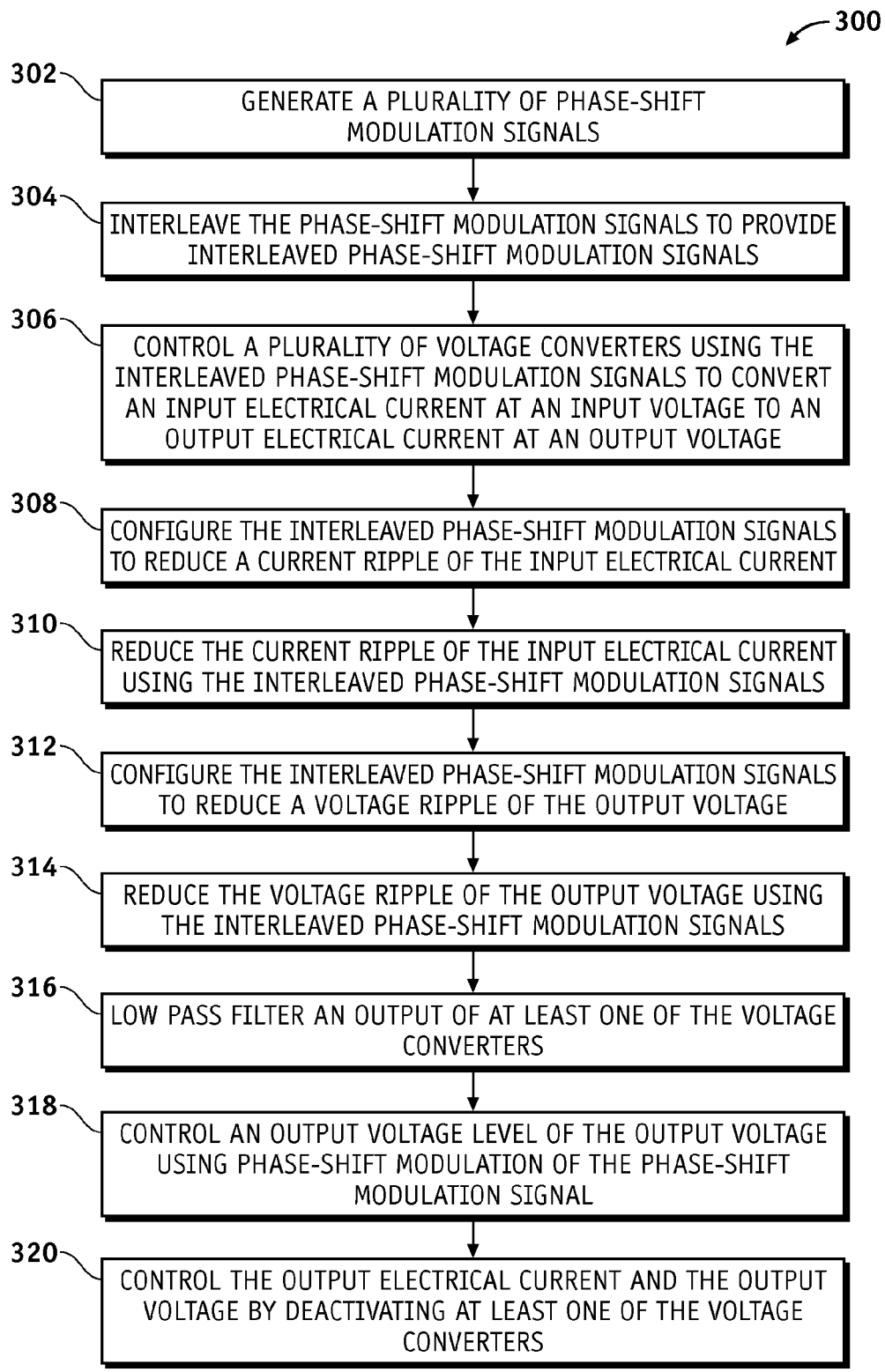
FIG. 3 is an illustration of an exemplary flowchart showing a voltage conversion process according to an embodiment of the disclosure.

FIG. 3 is an illustration of an exemplary flowchart showing a voltage conversion process 300 according to an embodiment of the disclosure. The various tasks performed in connection with the process 300 may be performed mechanically, by software, hardware, firmware, a computer-readable medium having computer executable instructions for performing the processes methods, or any combination thereof.

It should be appreciated that process 300 may include any number of additional or alternative tasks, the tasks shown in FIG. 3 need not be performed in the illustrated order, and the process 300 may be incorporated into a more comprehensive procedure or process having additional functionality not described in detail herein. For illustrative purposes, the following description of process 300 may refer to elements mentioned above in connection with FIGS. 1-2.

In practical embodiments, portions of the process 300 may be performed by different elements of the system 200 such as: the voltage converter-1 202, the voltage converter-N 216, the coupling circuit 228, and the control module 224, etc. Process 300 may have functions, material, and structures that are similar to the embodiments shown in FIGS. 1-2. Therefore, common features, functions, and elements may not be redundantly described here.

Process 300 may begin by generating a plurality of phase-shift modulation signals (task 302). A phase-shift modulation signal may be provided to achieve different output voltage levels according to a load requirement, or achieve a steady level of an output voltage with a varying input voltage.

Process 300 may continue by interleaving the phase-shift modulation signals to provide interleaved phase-shift modulation signals (task 304). The interleaved phase-shift modulation signals may be used to achieve a required output voltage and current ripple size.

Process 300 may continue by controlling a plurality of voltage converters such as the voltage converters 202/216 using the interleaved phase-shift modulation signals to convert an input electrical current at an input voltage to an output electrical current at an output voltage (task 306). The voltage converters 202/216 may each comprise a full bridge converter 204/210, a transformer 206/212, and a rectifier 238/240. The full-bridge converter 204/210 is coupled to at least one of the phase-shift modulation signals and the input electrical current, and is operable to convert the input electrical current to a first AC electrical current. The transformer 206/212 is coupled to the full bridge converter, and is operable to convert a first voltage of the first AC electrical current to a second voltage of a second AC electrical current. The rectifier 238/240 is coupled to the transformer, and is operable to convert the second AC electrical current to a DC output current. The outputs of the voltage converters 202/216 may be coupled, for example but without limitation, in series, in parallel, or other suitable configuration.

Process 300 may continue by configuring the interleaved phase-shift modulation signals to reduce a current ripple of the input electrical current (task 308). The interleaved phase-shift modulation signals may be configured to be interleaved at various interleaving angles, for example but without limitation, about 45 degrees, about 90 degrees, about 135 degrees, about 180 degrees, or other interleaving angle suitable to reduce the source input current ripple and/or to smooth transformer output voltages for a given application or device. For example, the interleaving angles may be selected such that the interleaved operation Mode 1 or the interleaved operation Mode 2, as explained above, is achieved. The operation Mode 1 may have about 50% less input current ripple compared to the operation Mode 2, and the ripple frequency may be doubled as well.

Process 300 may continue by reducing the current ripple of the input electrical current using the interleaved phase-shift modulation signals (task 310).

Process 300 may continue by configuring the interleaved phase-shift modulation signals to reduce a voltage ripple of the output voltage (task 312).

Process 300 may continue by reducing the voltage ripple of the output voltage using the interleaved phase-shift modulation signals (task 314).

Process 300 may continue by low pass filtering an output of at least one of the voltage converters (task 316).

Process 300 may continue by controlling an output voltage level of the output voltage using phase-shift modulation of the phase-shift modulation signals (task 318).

Process 300 may continue by controlling the output electrical current and the output voltage by deactivating at least one of the voltage converters (task 320). For example, in reference to FIG. 1, if the DC output 104 has a positive pole 112 of about +270V relative to a neutral N 114, and a negative pole 116 of about −270V relative to the neutral N 114, then the DC output 104 may be set to only the positive pole 112 of about +270V by deactivating the Phase C voltage converter and the Phase D voltage converter.

Figure 4:
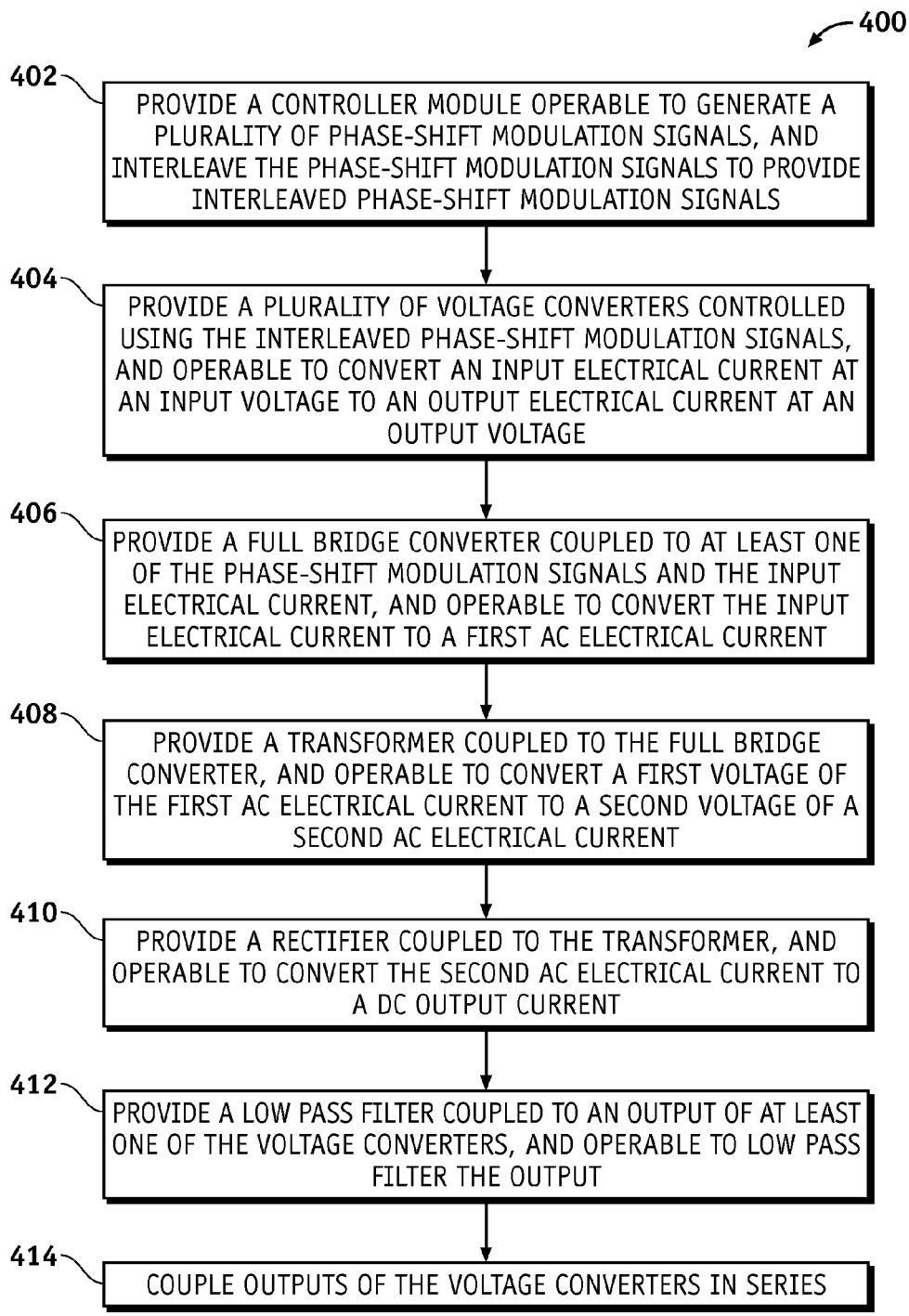
FIG. 4 is an illustration of an exemplary flowchart showing a process for providing a voltage conversion system according to an embodiment of the disclosure.

FIG. 4 is an illustration of an exemplary flowchart showing a process 400 for providing a voltage conversion system according to an embodiment of the disclosure. The various tasks performed in connection with process 400 may be performed mechanically, by software, hardware, firmware, a computer-readable medium having computer executable instructions for performing the processes, methods, or any combination thereof. For illustrative purposes, the following description of the process 400 may refer to elements mentioned above in connection with FIGS. 1-2.

It should be appreciated that the process 400 may include any number of additional or alternative tasks, the tasks shown in FIG. 4 need not be performed in the illustrated order, and the process 400 may be incorporated into a more comprehensive procedure or process having additional functionality not described in detail herein. In practical embodiments, portions of the process 400 may be performed by different elements of the system 200 such as: the voltage converter-1 202, the voltage converter-N 216, the coupling circuit 228, and the control module 224, etc. Process 400 may have functions, material, and structures that are similar to the embodiments shown in FIGS. 1-2. Therefore, common features, functions, and elements may not be redundantly described here.

Process 400 may begin by providing a controller module operable to generate a plurality of phase-shift modulation signals, and interleave the phase-shift modulation signals to provide interleaved phase-shift modulation signals (task 402).

Process 400 may continue by providing a plurality of voltage converters controlled using the interleaved phase-shift modulation signals, and operable to convert an input electrical current at an input voltage to an output electrical current at an output voltage (task 404).

Process 400 may continue by providing a full bridge converter coupled to at least one of the phase-shift modulation signals and the input electrical current, and operable to convert the input electrical current to a first AC electrical current (task 406).

Process 400 may continue by providing a transformer coupled to the full bridge converter, and operable to convert a first voltage of the first AC electrical current to a second voltage of a second AC electrical current (task 408).

Process 400 may continue by providing a rectifier coupled to the transformer, and operable to convert the second AC electrical current to a DC output current (task 410).

Process 400 may continue by providing a low pass filter coupled to an output of at least one of the voltage converters, and operable to low pass filter the output (task 412).

Process 400 may continue by coupling outputs of the voltage converters in series (task 414).

In this manner, embodiments of the disclosure provide a means to integrate a low voltage power source with an electric power distribution system such as an aircraft power distribution system, where regulated dual polarity for powering DC loads and single polarity for voltage source inverters are required.

Compared to existing converters, the 4-phase full bridge phase-shift-modulation converter according to embodiments of disclosure yields: Smaller input current ripple for fuel cell protection: 4 full bridge converters are interleaved at 45 degrees, the primary DC source (e.g., fuel cell) sees 4 times switching frequency current ripple (peak to peak ripple is at least 4 times smaller) compared to an existing solution using only one full bridge converter. Therefore, an input current ripple is reduced significantly.

Also, compared to a general power converter, a smaller input/output filter size of an interleaved converter architecture according to embodiments of disclosure reduces input stage and output stage capacitor Root Mean Square (RMS) current. Additionally, reduced Electro Magnetic interference (EMI) filtering stage size of an interleaved converter architecture according to embodiments of disclosure reduces output current and voltage ripple thus reducing EMI filtering requirements. Further, embodiments of an interleaved converter architecture described herein reduce semiconductor device stress by sharing power through 4 phases.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the control module 224 to cause the control module 224 to perform specified operations. Such instructions, generally referred to as "computer program code" or "program code" (which may be grouped in the form of computer programs or other groupings), when executed, enable power utilization scheduling methods of the system 200.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-4 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for voltage conversion, the method comprising:
    generating a plurality of phase-shift modulation signals;
    interleaving the phase-shift modulation signals to provide interleaved phase-shift modulation signals; and
    controlling a plurality of voltage converters using the interleaved phase-shift modulation signals to convert an input electrical current at an input voltage to an output electrical current at an output voltage, wherein outputs of the voltage converters are coupled in series via rectifiers coupled to respective transformer secondary sides.

2. The method according to claim 1, further comprising configuring the interleaved phase-shift modulation signals to reduce a current ripple of the input electrical current.

3. The method according to claim 2, further comprising reducing the current ripple of the input electrical current using the interleaved phase-shift modulation signals.

4. The method according to claim 1, further comprising configuring the interleaved phase-shift modulation signals to reduce a voltage ripple of the output voltage.

5. The method according to claim 4, further comprising reducing the voltage ripple of the output voltage using the interleaved phase-shift modulation signals.

6. The method according to claim 1, wherein the voltage converters each comprise:
    a full bridge converter coupled to at least one of the phase-shift modulation signals and the input electrical current, and operable to convert the input electrical current to a first AC electrical current;
    a transformer coupled to the full bridge converter, and operable to convert a first voltage of the first AC electrical current to a second voltage of a second AC electrical current; and
    a rectifier coupled to the transformer, and operable to convert the second AC electrical current to a DC output current.

7. The method according to claim 1, further comprising low pass filtering an output of at least one of the voltage converters.

8. The method according to claim 1, further comprising controlling an output voltage level of the output voltage using phase-shift modulation of the phase-shift modulation signals.

9. The method according to claim 1, further comprising controlling the output electrical current and the output voltage by deactivating at least one of the voltage converters.

10. A voltage conversion system comprising:
    a controller module operable to:
        generate a plurality of phase-shift modulation signals; and
        interleave the phase-shift modulation signals to provide interleaved phase-shift modulation signals; and
    a plurality of voltage converters controlled using the interleaved phase-shift modulation signals, and operable to convert an input electrical current at an input voltage to an output electrical current at an output voltage, wherein outputs of the voltage converters are coupled in series via rectifiers coupled to respective transformer secondary sides.

11. The voltage conversion system according to claim 10, wherein the controller module is further operable to configure the interleaved phase-shift modulation signals to reduce a current ripple of the input electrical current.

12. The voltage conversion system according to claim 10, wherein the controller module is further operable to configure the interleaved phase-shift modulation signals to reduce a voltage ripple of the output voltage.

13. The voltage conversion system according to claim 10, wherein the controller module is further operable to configure the interleaved phase-shift modulation signals to control the output electrical current and the output voltage by deactivating at least one of the voltage converters.

14. The voltage conversion system according to claim 10, wherein the voltage converters each comprise:
    a full bridge converter coupled to at least one of the phase-shift modulation signals and the input electrical current, and operable to convert the input electrical current to a first AC electrical current;
    a transformer coupled to the full bridge converter, and operable to convert a first voltage of the first AC electrical current to a second voltage of a second AC electrical current; and
    a rectifier coupled to the transformer, and operable to convert the second AC electrical current to a DC output current.

15. The voltage conversion system according to claim 10, further comprising a low pass filter coupled to an output of at least one of the voltage converters, and operable to low pass filter the output.

16. The voltage conversion system according to claim 10, wherein outputs of the voltage converters are coupled in series.

17. A method for providing a voltage conversion system, the method comprising:
    providing a controller module operable to:
        generate a plurality of phase-shift modulation signals; and
        interleave the phase-shift modulation signals to provide interleaved phase-shift modulation signals; and
    providing a plurality of voltage converters controlled using the interleaved phase-shift modulation signals, and operable to convert an input electrical current at an input voltage to an output electrical current at an output voltage, wherein outputs of the voltage converters are coupled in series via rectifiers coupled to respective transformer secondary sides.

18. The method according to claim 17, wherein the step of providing the voltage converters further comprises:
    providing a full bridge converter coupled to at least one of the phase-shift modulation signals and the input electrical current, and operable to convert the input electrical current to a first AC electrical current;
    providing a transformer coupled to the full bridge converter, and operable to convert a first voltage of the first AC electrical current to a second voltage of a second AC electrical current; and
    providing a rectifier coupled to the transformer, and operable to convert the second AC electrical current to a DC output current.

19. The method according to claim 17, further comprising providing a low pass filter coupled to an output of at least one of the voltage converters, and operable to low pass filter the output.

20. The method according to claim 17, further comprising coupling outputs of the voltage converters in series.

* * * * *